S. G. THOMSON.
SWINGING BOLSTER HANGER FOR TRUCKS.
APPLICATION FILED OCT. 1, 1915.
1,168,347.
Patented Jan. 18, 1916.
2 SHEETS—SHEET 1.
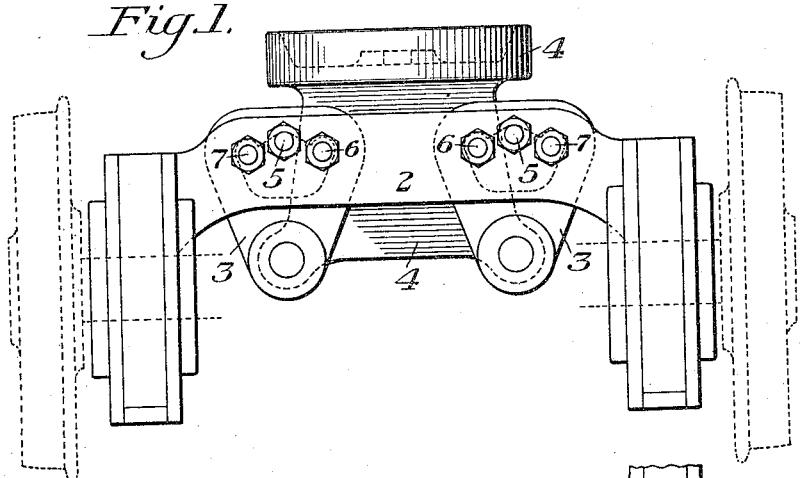
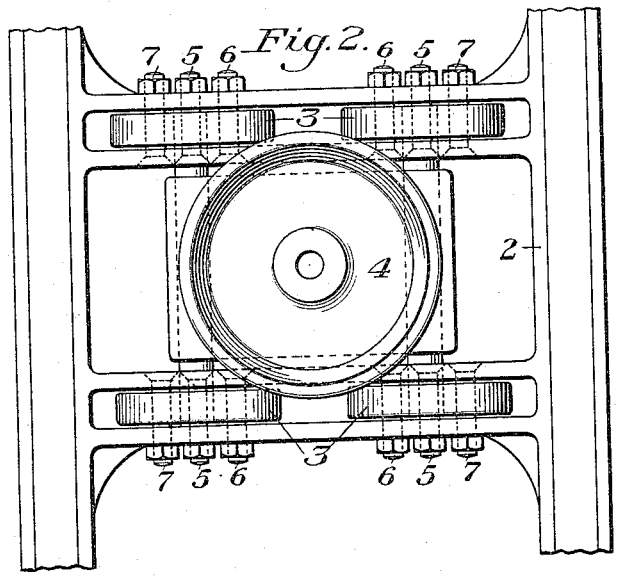
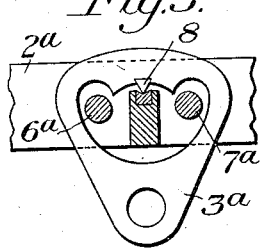 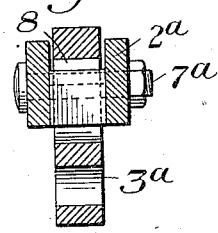 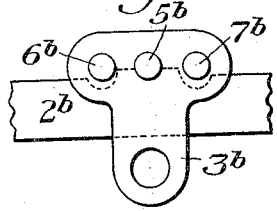 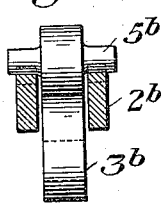
WITNESSES
INVENTOR
S. G. Thomson S. G. THOMSON.
SWINGING BOLSTER HANGER FOR TRUCKS.
APPLICATION FILED OCT. 1, 1915.

1,168,347.

Patented Jan. 18, 1916.
2 SHEETS—SHEET 2.

WITNESSES
R. A. Balderson
J. B. Bluming

INVENTOR
S. G. Thomson

UNITED STATES PATENT OFFICE.

SAMUEL G. THOMSON, OF READING, PENNSYLVANIA.

SWINGING-BOLSTER HANGER FOR TRUCKS.

1,168,347.　　　　Specification of Letters Patent.　　Patented Jan. 18, 1916.

Application filed October 1, 1915.　Serial No. 53,578.

*To all whom it may concern:*

Be it known that I, SAMUEL G. THOMSON, a citizen of the United States, residing at Reading, in the county of Berks and State of Pennsylvania, have invented a new and useful Improvement in Swinging-Bolster Hangers for Trucks, of which the following is a full, clear, and exact description, reference being had to the accompanying drawings, forming part of this specification, in which—

Figure 7:
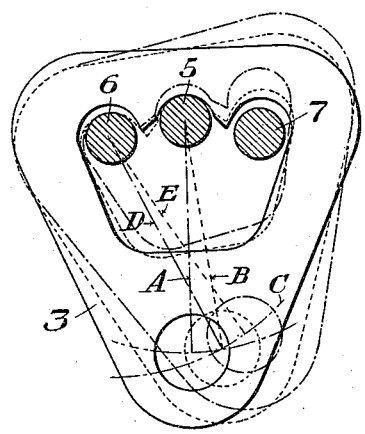
Figure 8:
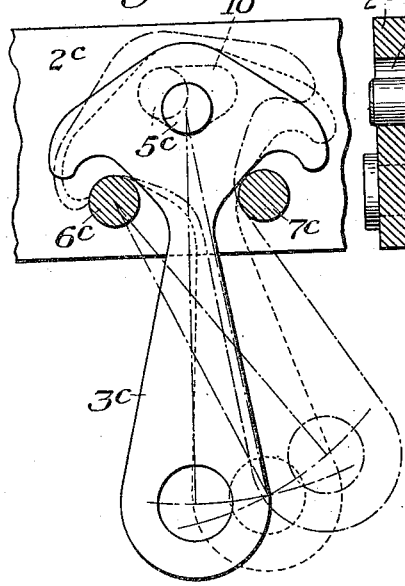
Figure 9:
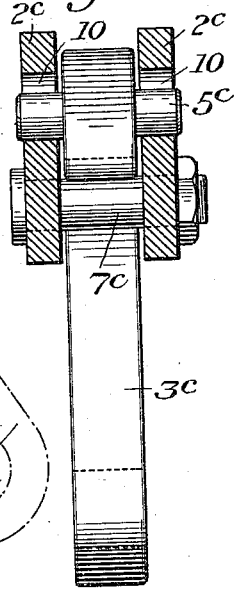
Figure 10:
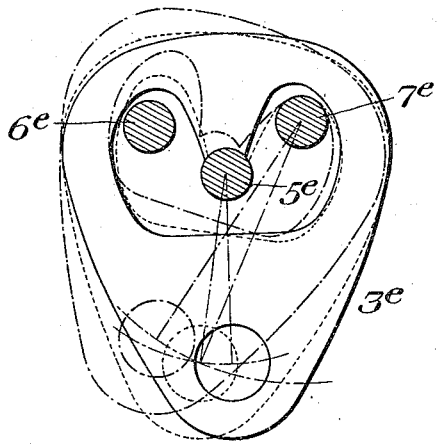
Figure 11:
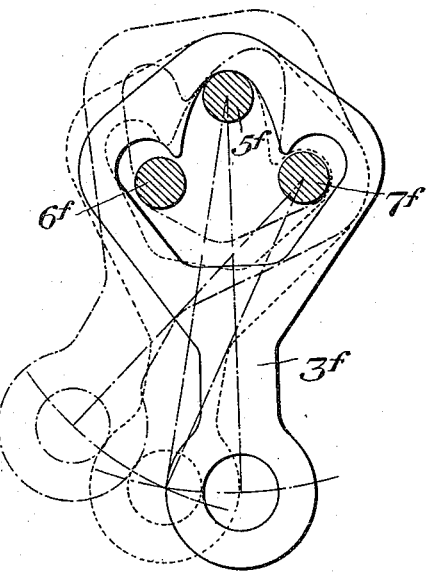

Figure 1 is an end view of a truck having one form of my improved hanger. Fig. 2 is a plan view thereof. Fig. 3 is a transverse section through a portion of a truck and one form of hanger. Fig. 4 is a sectional view thereof. Fig. 5 is a view similar to Fig. 3 showing another form of hanger. Fig. 6 is a sectional view thereof. Fig. 7 is a diagram illustrating the various positions of the hanger shown in Figs. 1 and 2. Fig. 8 is an end view of another form of hanger. Fig. 9 is a sectional view of the hanger shown in Fig. 8, and Figs. 10 and 11 are side elevations of still other forms of hangers.

This invention relates to an improvement in hangers for swinging or movable truck bolsters, or center bearing members for trucks, and is designed to provide an efficient device of this character which will permit the bolster to swing laterally rather freely for a predetermined distance beyond each side of its central position, and then increase the resistance to side swinging after the midpoint has been reached.

With the usual hangers, spread or placed at an angle, or the usual heart-shaped links having two separated points of suspension, the resistance to lateral movement is very rigid at all times, and when such hangers are used in connection with trucks for locomotives, the wheels of the trucks will bind against the journal boxes, unless sufficient free lateral movement is allowed between the faces of the hubs and the journal boxes to avoid the binding when the wheels are thrust laterally with relation to the journal boxes when rounding curves. With the use of a stiffly moving center bearing or bolster, excessive hub wear will take place when rounding curves, causing heating of journals, until the clearance becomes enough for the various parts to free themselves under the usual operating conditions of the locomotive. It is also well known that a hanger placed vertically with one point of suspension allows too much lateral movement and does not afford sufficient guiding resistance or resistance to excessive thrusts and swaying at high speed. On the other hand the spread hangers or heart-shaped links do not allow any freedom or bolster movement as a substitute for side play between wheel hubs and journal boxes, enough of which should be permitted to relieve the locomotive from frame strains on curves, and also to take up ordinary unevenness of track without throwing excessive pressure on the wheel hubs.

My invention provides a swinging or movable truck bolster or center member, which will allow the bolster to move laterally rather freely for a predetermined distance beyond its central position, and which will at the same time cause increased resistance to swinging as soon as the bolster moves beyond a predetermined point away from its central position. I accomplish this by means of a three-point suspended hanger in which the hangers are supported from their central point and about which they are adapted to freely swing when there is no lateral thrust on the wheels. The other points of suspension are so placed that the load can freely swing a predetermined distance on each side of the central position before the hangers will rotate about either one of these points of suspension. These points of suspension are so placed that increased resistance to side swinging is afforded to resist the swinging movement. When a three-point suspension hanger is used in a leading truck of a locomotive, the three points may be so arranged as to give a very short free central swing and an abrupt resistance to further side swinging which will quickly come into play, so as to guide the locomotive without allowing it to swing too far out of its central position. When used with a trailing truck, a much longer relatively flat arc may be allowed for the central swing, thus giving freedom against binding while curving, and thus relieving the hub friction; the more abruptly rising side arcs being later brought into play to resist lateral thrusts and excessive swaying at high speeds. In the trailing truck, very rigid resistance for guiding purposes is not required; in fact it would be objectionable, as it would stiffen up the locomotive on curve and act the same as the usual heart-shaped two-point suspended links or hangers spread at an angle to resist lateral thrusts.

Referring to Figs. 1 and 2 of the drawings, the reference character 2 designates a truck which may be of any specific type, and from which is hung a plurality of swinging links 3, and to the lower end of which is pivoted a central bearing member 4, which may be of any approved type. In this construction the hangers 3 are normally supported on the central pins 5, about which they are adapted to freely swing, but if the center bearing is swung in a lateral direction a predetermined distance, the bearing portions of the swinging members 3 will engage and swing about either the pins 6 or 7, depending on which direction the center bearing member is shifted.

In Figs. 3 and 4 the swinging member $3^a$ is provided with a knife bearing 8 about which it is adapted to freely swing, until the member is swung a sufficient distance to engage either the pins $6^a$ or $7^a$. This knife bearing is of the usual form having a hardened knife edge bearing which forms the middle point of suspension, and which engages a hardened piece of steel inserted in a portion of the truck frame.

In Figs. 5 and 6 the hanger $3^b$ is provided with pins $5^b$, $6^b$ and $7^b$ which are adapted to be seated in suitable recesses in the truck frame. In this construction the bearing surfaces are on the outside of the swinging member, while in the previous constructions described the bearing surfaces are within the swinging member.

In Fig. 7 I have shown in diagram a construction similar to that shown in Figs. 1 and 2, in which the swinging member 3 is shown in three different positions, the central position being shown in solid lines and in which the hanger is suspended freely from the pin 5, the dotted lines showing the position assumed when the hanger engages the side pin 6, while still in contact with the pin 5; and the broken lines show the position assumed after the hanger has been shifted a sufficient distance to clear the pin 5.

While the hanger is suspended on pin 5 it can swing freely to either side through a relatively flat arc embraced by the radii A and B, and when shifted a predetermined distance the center of rotation is transferred to pin 6 when the hanger swings farther to the side through the more steeply inclined arc C between the positions of the radii D and E until it assumes the position shown in broken lines.

Figs. 8, 10 and 11 show similar positions for three modified forms of hangers.

In the construction shown in Figs. 8 and 9 the central pin $5^c$ is connected to the hanger and is seated in slots in portions $2^c$ of the truck frame, and the pins $6^c$ and $7^c$ about which the hanger oscillates when in its extreme positions are connected to the truck frame.

Fig. 10 shows a construction in which its central suspending pin $5^e$ is considerably below the outer pins $6^e$ and $7^e$; whereas in Fig. 11 the pin $5^f$ is above the pins $6^f$ and $7^f$.

It will be obvious from Figs. 10 and 11 that any relation desired may be obtained between the length of the radius of the central point of suspension and the radii of the side points of suspension. With a comparatively short central radius as shown in Fig. 10, the swinging of the hanger through the central zone would not be quite as free as with a comparatively flat arc caused by the longer central radius of Fig. 11. There would be more centering action of the hanger as shown in Fig. 10 in its central position than of the hanger as shown in Fig. 11. A variation in the relation of the central arcs and side arcs can also be had by spreading the side bearing members a greater distance from the central member, which, with the possibility of raising and lowering the relationship of the central and side suspension points, makes it possible to design hangers which will have any desired resistance against swinging in its central positions, and any desired resistance in its swing through the side positions.

It will readily be understood by those familiar with the art that various other designs of hangers may be made to meet the various conditions.

The advantages of my invention result from the provision of a hanger having a central point of suspension about which it is adapted to freely swing, and final resistance side bearings about which the hanger is adapted to swing after it has moved a predetermined distance in either direction. The invention affords a free lateral movement of the locomotive in the body of the truck itself, without resort to excessive side play between the hubs of the wheels and the journal boxes in order to take care of track unevenness and while on curves or in passing through switches. At the same time, a maximum resistance is provided at each side of a limited central zone to prevent excessive swaying at high speeds. By the use of a device of this kind a locomotive will ride smoothly; frame stresses are largely eliminated, as well as hub friction, and consequently hot journals, which usually cause delays and heavy expense involved in removing wheels and journal boxes to line up and take out lost motion between the parts which have been ground out by excessive pressure and stiffly related parts.

The truck herein shown and described is more particularly related to locomotives, but it will readily be understood that the swinging hangers can be used in connection with trucks of any character.

I claim:

1. In a truck for locomotives or cars, a swinging hanger having at least three separate points of suspension.

2. In a truck for locomotives or cars, a swinging hanger having one point of suspension in its middle position, and another separate point of suspension arranged to come into action after swinging away from its middle position.

3. In a truck for locomotives or cars, a swinging hanger having at least two separate suspension points in different horizontal planes.

4. In a truck for locomotives or cars, a swinging hanger having a point of suspension in its mid position, and also having a separate point of suspension on each side of said point.

5. In a truck for locomotives or cars, a swinging hanger arranged to engage at least two separate bearing or suspension points in succession, as it swings from its mid positions to its extreme side positions.

6. In a truck for locomotives or cars, a supporting bolster or bearing member, a truck frame member, and a swinging hanger connecting said members; said hanger having at least three separate points of suspension.

7. In a truck for locomotives or cars, a supporting bolster or bearing member, a truck frame member, and a swinging hanger connecting said members, the lower end of said hanger being attached to said bolster, and the upper end of said hanger engaging at least three separate suspension points or bearings on said truck frame.

8. In a truck for a locomotive or car, a hanger having a plurality of points of suspension in different horizontal planes, one portion of the arc of swing of said hanger being of a different length of radius when suspended from one point than when suspended from another point.

9. In a truck for locomotives or cars, a swinging hanger having a plurality of points of suspension in different horizontal planes, said points of suspension being adapted to change the center of the arc through which it swings as it moves from its middle to its side positions.

10. In a truck for locomotives or cars, a hanger having three points of suspension and mounted to swing through three different arcs about said points in its extreme movement from one side to the other.

11. In a truck for locomotives or cars, a hanger having three points of suspension, said hanger being adapted to swing through one arc when supported on its central point of suspension, and other arcs when supported on its side points of suspension.

12. In a truck for locomotives or cars, a hanger having three points of suspension and adapted to swing through an arc in its side positions which raises its lower end more rapidly when supported on its side points of suspension, than the arc through which it swings when supported on its central point of suspension; substantially as described.

In testimony whereof, I have hereunto set my hand.

SAMUEL G. THOMSON.

Witnesses:
J. I. Ross,
Harry Egolf.